(12) United States Patent
Quintel

(10) Patent No.: US 9,440,170 B2
(45) Date of Patent: Sep. 13, 2016

(54) LIQUID FILTER APPARATUS

(71) Applicant: Eaton Corporation, Cleveland, OH (US)

(72) Inventor: Mark Anthony Quintel, Kalamazoo, MI (US)

(73) Assignee: EATON CORPORATION, Cleveland, OH (US)

(*) Notice: Subject to any disclaimer, the term of this patent is extended or adjusted under 35 U.S.C. 154(b) by 800 days.

(21) Appl. No.: 13/713,522

(22) Filed: Dec. 13, 2012

(65) Prior Publication Data

US 2014/0166564 A1  Jun. 19, 2014

(51) Int. Cl.
| | |
|---|---|
| *B01D 29/68* | (2006.01) |
| *B01D 35/30* | (2006.01) |
| *B01D 29/50* | (2006.01) |
| *B01D 29/11* | (2006.01) |
| *B01D 29/52* | (2006.01) |
| *B01D 29/66* | (2006.01) |
| B01D 35/00 | (2006.01) |

(52) U.S. Cl.
CPC .......... *B01D 29/682* (2013.01); *B01D 29/114* (2013.01); *B01D 29/50* (2013.01); *B01D 29/52* (2013.01); *B01D 29/668* (2013.01); *B01D 35/30* (2013.01); *B01D 35/303* (2013.01); *B01D 2201/0453* (2013.01); *B01D 2201/4015* (2013.01)

(58) Field of Classification Search
CPC .... B01D 35/303; B01D 35/30; B01D 29/52; B01D 29/50; B01D 29/114; B01D 29/668; B01D 29/682; B01D 2201/4015; B01D 2201/453
USPC ............ 210/333.01, 333.1, 237, 323.1, 411, 210/282, 330, 338, 339, 340, 345, 393, 402, 210/407, 408, 425, 427, 458, 252, 465, 470, 210/108, 200, 203, 256, 253, 275
See application file for complete search history.

(56) References Cited

U.S. PATENT DOCUMENTS

| | | | |
|---|---|---|---|
| 2,237,964 A | 4/1941 | Naught | |
| 4,522,717 A * | 6/1985 | Brust | ............. 210/238 |
| 2009/0200226 A1* | 8/2009 | Straeffer et al. | ......... 210/321.74 |
| 2012/0125834 A1* | 5/2012 | Gessner et al. | ............... 210/411 |

FOREIGN PATENT DOCUMENTS

| | | |
|---|---|---|
| DE | 3621724 A1 | 1/1988 |
| DE | 202004005849 U1 | 5/2005 |

* cited by examiner

Primary Examiner — Madeline Gonzalez
(74) Attorney, Agent, or Firm — Walker & Jocke

(57) ABSTRACT

A filter (10) includes a liquid holding vessel (12) with an inlet (14) and an outlet (16). A removable filter cartridge (24) is positionable within the vessel. The cartridge includes a plurality of filter element assemblies (82) each of which includes a plurality of filter elements (86). Filter elements are selectively back flushed through a back flush assembly (26) which includes a positionable back flush conduit arm (28) that rotates in response to a back flush arm shaft (36) that extends in a shaft support (46) of the filter cartridge.

24 Claims, 7 Drawing Sheets

LIQUID FILTER APPARATUS

TECHNICAL FIELD

This invention relates to a filtration apparatus that is operable to remove impurities from liquid materials. This invention further relates to removable filter cartridge elements which are operative to remove such impurities and which can be readily changed when needed.

BACKGROUND

Filtration of liquid materials is required in many processes to remove impurities or other contaminants. Filtration is often accomplished by causing a liquid to flow through a filter material which causes the contaminants to be separated and to collect on or in the filter material. The liquid that is cleansed of the contaminants collected on or in the filter material is then directed to such uses and processes that can be carried out once the contaminants have been removed.

Over time as contaminants are removed they collect on the filter material and eventually restrict the flow of liquid therethrough. When this occurs, the filter material either needs to be changed or cleaned. This can be done in some arrangements by replacing the filter material with new material and the filtration process continues. Unfortunately in many such arrangements the filtration process and the flow of liquid must be interrupted while the filter material is replaced.

In other arrangements the filter material can be cleansed of contaminants so that the same material can continue to be used to filter the liquid. One approach to cleansing the filter material is to reverse the flow of liquid across the filter material from the direction of flow that normally occurs during removal of contaminants. This reversing of flow which is sometimes referred to as back flushing, operates to dislodge the contaminants that have been collected on the dirty side of the filter material. These contaminants once dislodged can settle or otherwise be directed away from the filter material a sufficient distance so that the contaminants will not rapidly collect on the filter material when the flow is returned to the normal direction. This approach provides the advantage that the filter material can be used for a longer period of time before it needs to be replaced.

Further in some arrangements, filter media in multiple filter element arrangements is provided so that the flow of filtered liquid can continue even during times that a filter element is being back flushed. This may be accomplished by continuing the flow of liquid in the filtering direction through one or more of the multiple filter elements while one or more other elements are subject to being back flushed. The periodic back flushing of respective filter elements at different times serves to keep the filter material from becoming restricted or blocked and helps to assure adequate liquid flow.

In some prior systems multi-element arrangements that provide the capability for back flushing have included fixed support structures for the filter elements and back flush structures within a filter vessel. These arrangements have included rigidly welded filter element support structures that are necessary to support and maintain the accurate position of the filter elements. This is sometimes necessary in high pressure, high flow filtration systems where the pressure that is exerted on the filter elements and other components would otherwise cause the filter elements or other structures to move, collapse or otherwise fail during use.

Filter structures that include such rigid elements can sometimes prevent ready access to components that periodically need maintenance or replacement. For example, in some arrangements the structures that facilitate back flushing and the flow of contaminants out of the filter vessel that have been dislodged from elements, may be obscured by the filtration and support structures. As a result when such items fail and become inoperable, they can be difficult to access for purposes of repair. This can result in extended periods of filter downtime. The filtered liquid required for the associated use is then not available, which causes the other industrial processes that depend on the filtered liquid to also be shut down. Considerable labor, effort and expense can also be necessary to repair and place such filtration systems back in operation.

Liquid filtration systems may benefit from improvements.

SUMMARY OF DISCLOSURE

This application discloses an exemplary arrangement of a liquid filtration apparatus. The liquid filtration apparatus provides for generally continuous operation in removing contaminants from liquids. Contaminants collected on the filter material are removed from filter elements through back flushing of selected elements while the flow of filtered material is maintained. A removable cartridge arrangement provides for a rigid support for filtration elements but is also removable from the filter vessel to enable access to back flushing components and other structures that may need periodic replacement or service. The example filter cartridge also includes a plurality of removable multi-element filter assemblies that can be readily removed from the filter cartridge and replaced. Methods for filtration of liquid materials and for servicing the liquid filtration apparatus are also disclosed.

DETAILED DESCRIPTION

Figure 1:
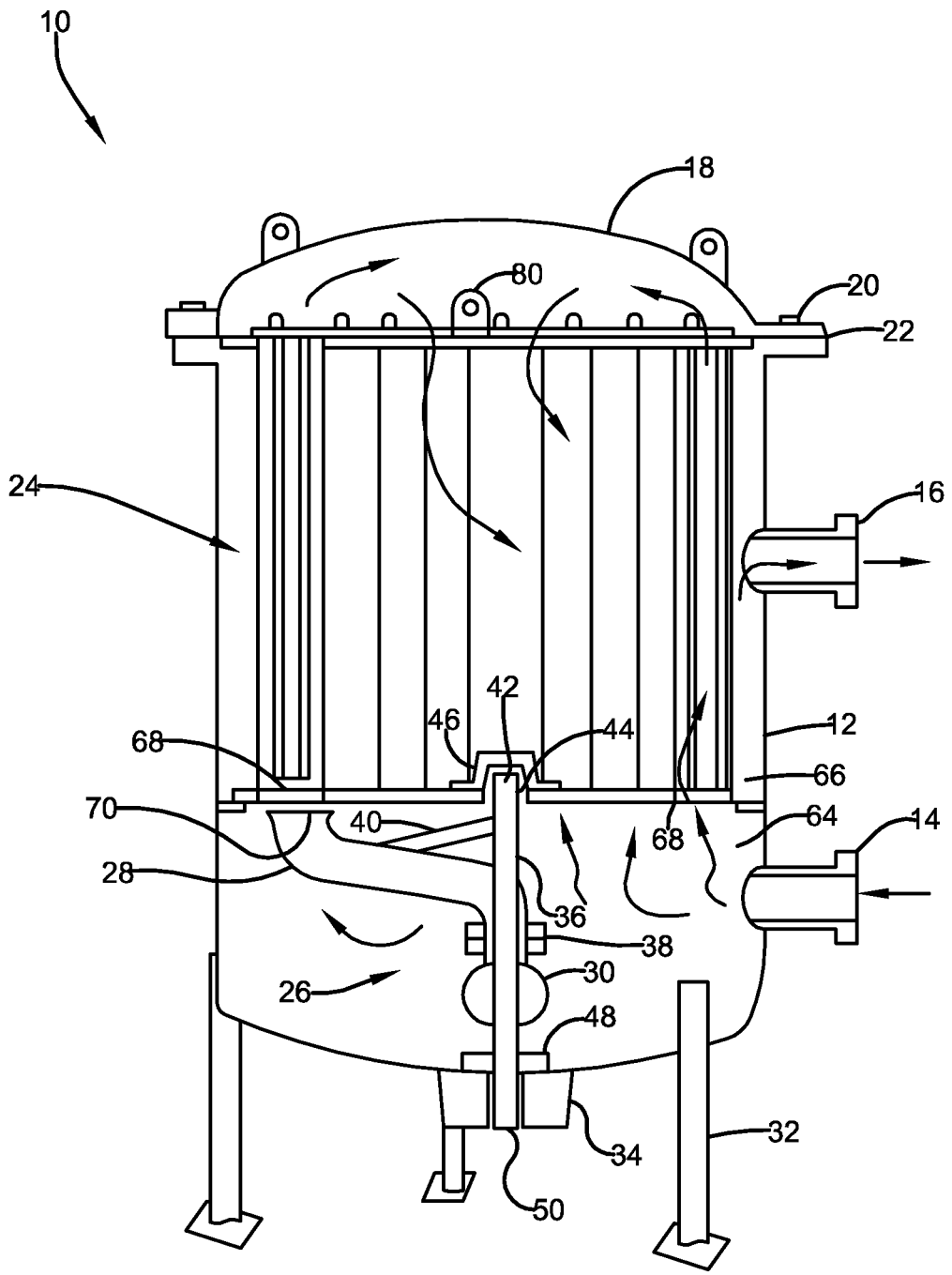
FIG. 1 is a schematic cutaway view of an example liquid filtration apparatus.

Referring now to the drawings, and particularly to FIG. 1, there is shown therein an example filter generally indicated 10. The example filter shown may be used for filtering liquids in high pressure, high flow applications. It should be understood that the principles described herein may be used with numerous types of liquids and filtration arrangements.

The example filter 10 includes a liquid holding filter vessel generally indicated 12. Vessel 12 includes an inlet 14. Inlet 14 receives incoming liquid that includes contaminants that are removed through operation of the filter. Vessel 12 further includes an outlet 16 that delivers the filtered liquid from the filter. Vessel 12 further includes a removable head 18. Removable head 18 is held in engaged relation with the filter vessel through a plurality of removable fasteners 20 that extend about a flange portion of the head 22 and engage a similar flange portion of the vessel. In the operative position the head 18 is held to the vessel in fluid tight engagement. The exemplary filter includes a filter cartridge 24 that is later described in detail. The exemplary cartridge 24 includes a plurality of filter elements that include filter material that operates to separate contaminants from the liquid as it flows from the inlet 14 to the outlet 16 within the interior of the filter vessel.

The exemplary filter also includes a back flush assembly generally indicated 26. The back flush assembly operates in a manner later described to reverse the flow of liquid through the filter elements. The back flush assembly includes a selectively positionable back flush conduit arm 28 that collects contaminants dislodged from filter elements and directs them to a back flush outlet conduit 30 from which the contaminants can be discharged from the vessel.

The exemplary filter also includes supports 32 which serve to hold the vessel in a generally vertical orientation as shown. Further in the exemplary arrangement, the filter is in operative connection with a drive 34. Drive 34 is operative to selectively rotate a back flush arm shaft 36, which in the exemplary arrangement causes the back flush conduit arm 28 to be selectively rotated and positioned in a desired position for back flushing in the manner later described. The example back flush assembly further includes a rotatable fluid coupling 38. The rotatable fluid coupling of an example arrangement is configured to enable the back flush conduit arm to rotate relative to the back flush outlet conduit 30 while maintaining generally fluid tight engagement therewith. The exemplary rotatable fluid coupling includes at least one bearing surface to facilitate rotation of the back flush conduit arm. The example coupling is also configured to be readily separated such that the arm can be disengaged from the back flush outlet conduit for purposes of repair and servicing.

The exemplary back flush assembly further includes a support strut 40. Support strut 40 operatively extends between the back flush arm shaft and the back flush arm to provide support thereto. The back flush arm shaft includes a first shaft end 42. In the operative position of the filter cartridge 24 within the vessel, the first shaft end 42 extends into a shaft accepting opening 44 of a support 46. The shaft accepting opening of the example arrangement is configured so that the shaft may readily rotate within the support 46 on the cartridge. The support 46 provides radial bearing support to maintain the shaft extending in an axial direction during operation.

The exemplary arrangement further includes a shaft support 48 at the bottom interior of the vessel through which the shaft 36 extends. The shaft includes a shaft second end 50 that extends outside the vessel and which is in operative engagement with the drive 34. As can be appreciated, the shaft support 48 and the lower end of the back flush conduit through which the shaft passes may include appropriate bearing and sealing elements for purposes of preventing fluid leakage in the areas where the shaft 36 extends therethrough.

Figure 2:
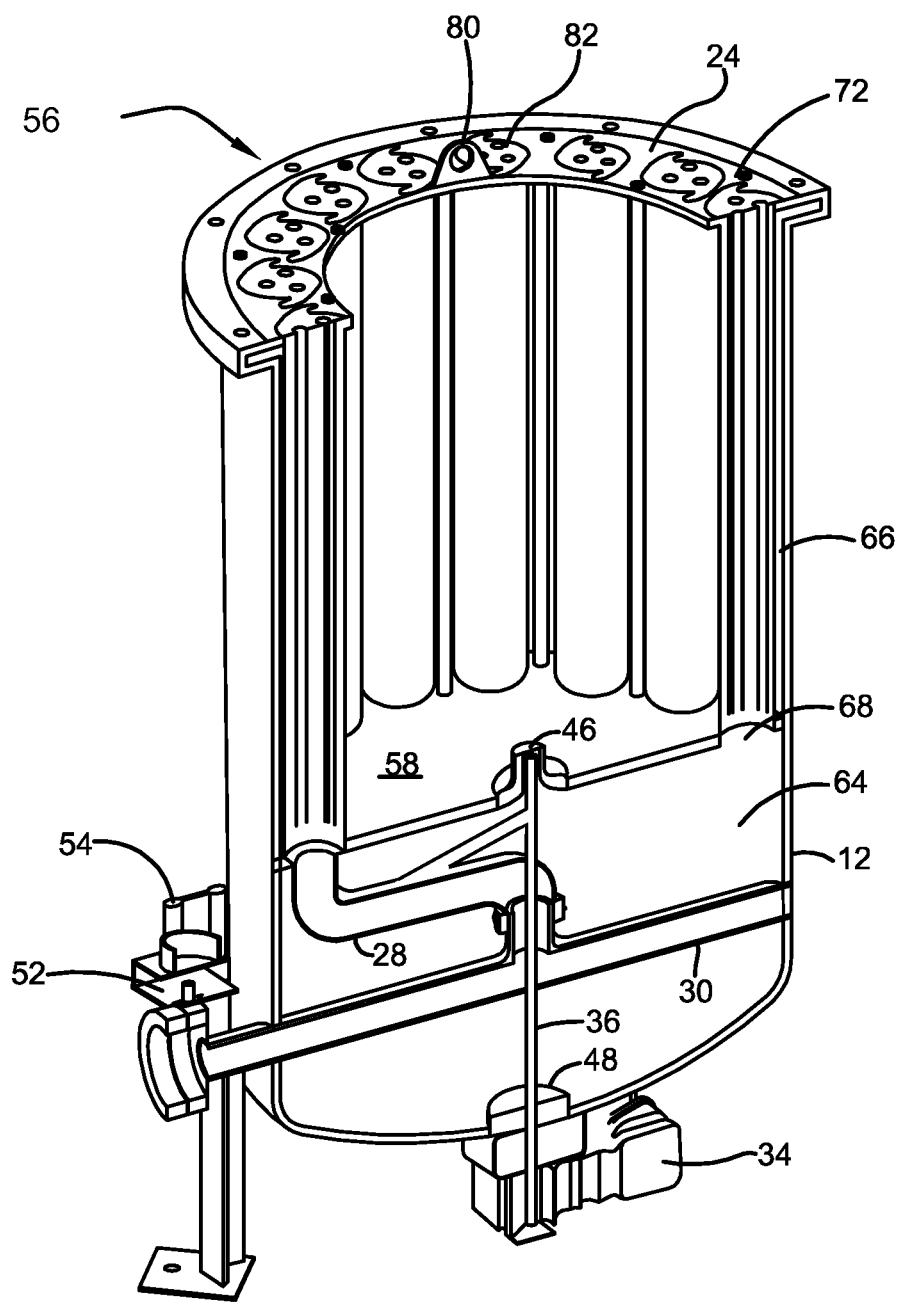
FIG. 2 is an isometric sectional view of an example liquid filtration vessel with the head removed and showing the internal filter cartridge and back flush structures of an example arrangement.
Figure 3:
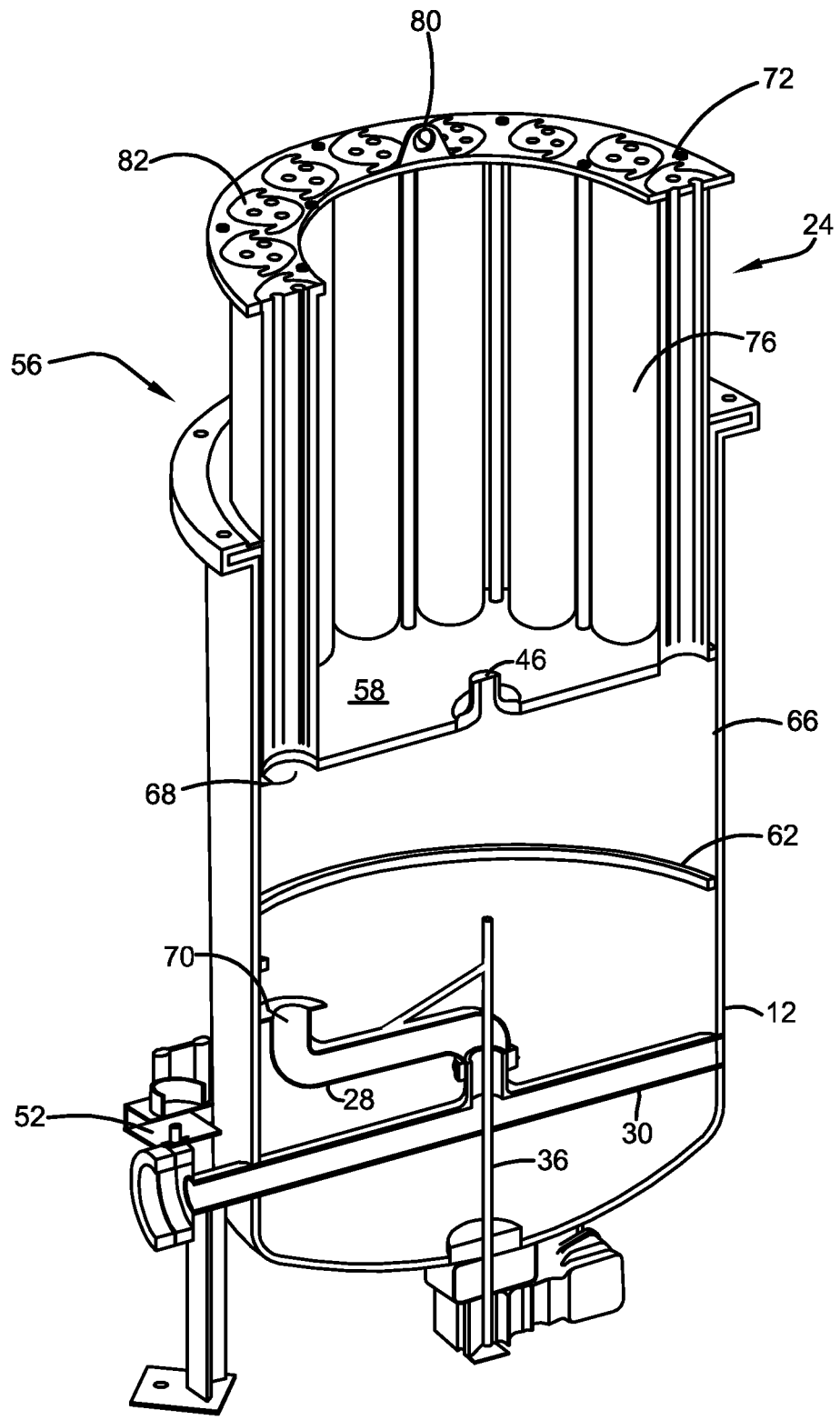
FIG. 3 is an isometric view similar to FIG. 2 showing the filter cartridge partially removed from the interior area of the filter vessel.

As best shown in FIGS. 2 and 3, the back flush outlet conduit 30 is in operative connection with a back flush valve 52. Back flush valve 52 is in operative connection with an electric or pneumatic actuator 54 which controls the condition of the back flush valve and causes the valve to change between the open and closed conditions. As later described, the back flush valve is opened when the back flush conduit arm 28 is selectively positioned to enable backward flow through selected filter elements to remove contaminants from the filter material thereof.

Figure 4:
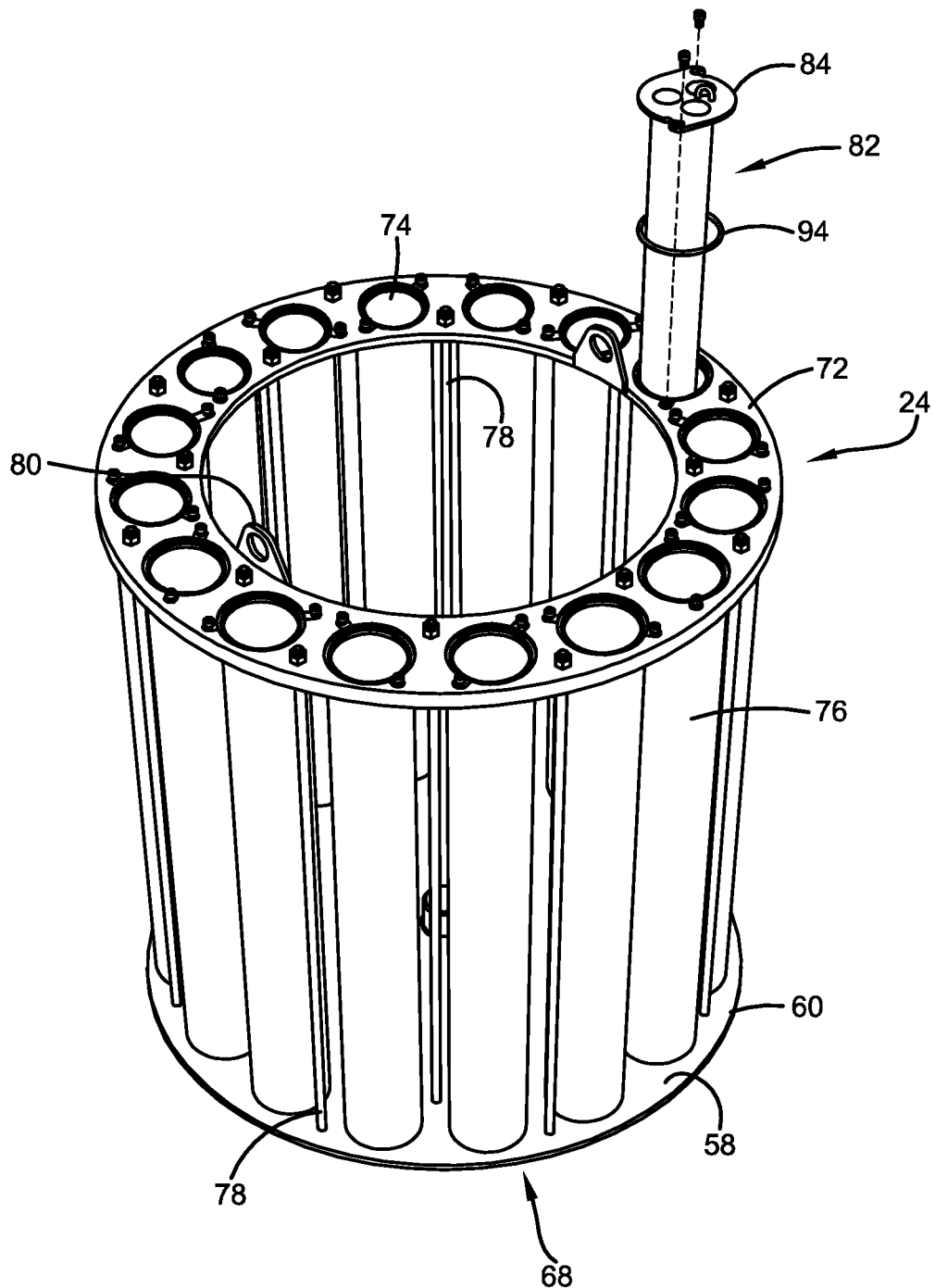
FIG. 4 shows an isometric view of an example filter cartridge including a filter element assembly partially removed and extended upwards from one of the element housings on the cartridge.

The example filter cartridge 24 is shown in greater detail in FIGS. 2, 3 and 4. FIG. 2 shows the vessel 12 with the head 18 removed therefrom. The removal of the head from the filter vessel provides access through a cartridge opening generally indicated 56 at the top of the vessel. The cartridge opening 56 enables access to the cartridge. This enables the cartridge to be lifted upward from its operative position as shown in FIG. 3, to facilitate removal of the cartridge from the vessel.

As best represented in FIG. 4, the exemplary cartridge includes a first body 58. The body 58 is a generally disc shaped planar body. The body 58 includes an annular peripheral portion 60. Peripheral portion 60 extends generally in a plane and is configured to engage an annular inward extending cartridge support projection 62 inside the vessel as shown in FIG. 3. The cartridge support projection extends about the interior wall of the vessel and supports the filter cartridge in the operative position through engagement therewith. In some exemplary arrangements suitable sealing material such as a resilient elastomer gasket that is resistant to the liquid and contaminants being filtered may be positioned between the peripheral portion 60 and the support projection 62 to further provide sealing between the cartridge and the vessel in the operative position. Such sealing material may be desirable in some arrangements because, as will be appreciated in the following description, the disc shaped body 58 of the cartridge operates to separate a first side 64 of the vessel interior which is exposed to the unfiltered liquid, from a second side 66 which contains the filtered liquid.

In the exemplary arrangement the first body 58 is in operative connection with the shaft support 46. The shaft support includes an opening 44 that accepts the shaft first end 42 of the shaft 36 therein when the cartridge is in the operative position. The support projection 62 of the vessel supports the first body 58 such that it extends in a plane that is perpendicular to the axial direction in which the shaft 36 extends. This enables the rotation of the shaft 36 in the support 46 and helps to maintain the back flush conduit arm 28 in the proper orientation.

The exemplary first body 58 of the cartridge further includes a plurality of back flush openings 68. In the exemplary cartridge the first body includes 16 back flush openings 68. Of course, in other example arrangements a different number of such openings may be used. The back flush openings are arranged in an annular first ring on the first body and are disposed radially somewhat inward from the annular peripheral portion 60. The back flush openings of the exemplary arrangement are sized so as to generally conform to an opening 70 into the back flush conduit arm 28. This configuration helps to facilitate the back flush conduit arm capturing the contaminants that are dislodged from the filter elements during back flushing.

The exemplary filter cartridge 24 further includes a second body 72. Second body 72 is disposed in the axial direction from the first body 58. Second body 72 of an example embodiment is an annular body that includes a plurality of element openings 74. Body 72 includes the same number of element openings 74 as the first body 58 includes back flush openings 68. Each element opening is axially aligned with a respective back flush opening. Of course it should be understood that this arrangement is exemplary and in other embodiments other arrangements may be used.

A plurality of element housings 76 extend between each respective element opening 74 and back flush opening 68. In the exemplary cartridge, each element housing 76 includes a generally fluid impervious tube that is open at each end. The ends of each element housing are operatively attached to the first body and the second body in generally fluid tight relation. As can be appreciated, this arrangement prevents passage of the unfiltered liquid from the first side 64 (dirty side) to the second side 66 (clean side) in the areas where the element housings are engaged with the first and second cartridge bodies.

In the exemplary cartridge a plurality of rod shaped support members 78 extend between the first body 58 and the second body 72. The exemplary support members 78 extend outside the filter element housings and connect the first body and the second body. The support members 78 further facilitate providing sufficient rigidity and structural integrity for the filter cartridge. The second body 72 further includes cartridge lifting eyes 80. The cartridge lifting eyes 80 facilitate removing the cartridge from the filter vessel by engagement with a suitable lifting member. Likewise the lifting eyes can be used for purposes of holding the filter cartridge 24 during installation within the filter vessel.

The exemplary cartridge 24 includes a plurality of filter element assemblies 82. Each filter element assembly 82 is configured in the operative position to extend within an element housing 76. Each filter element assembly 82 of the exemplary arrangement is configured to be releasibly attached to the filter cartridge through engagement with the second body 72.

Figure 5:
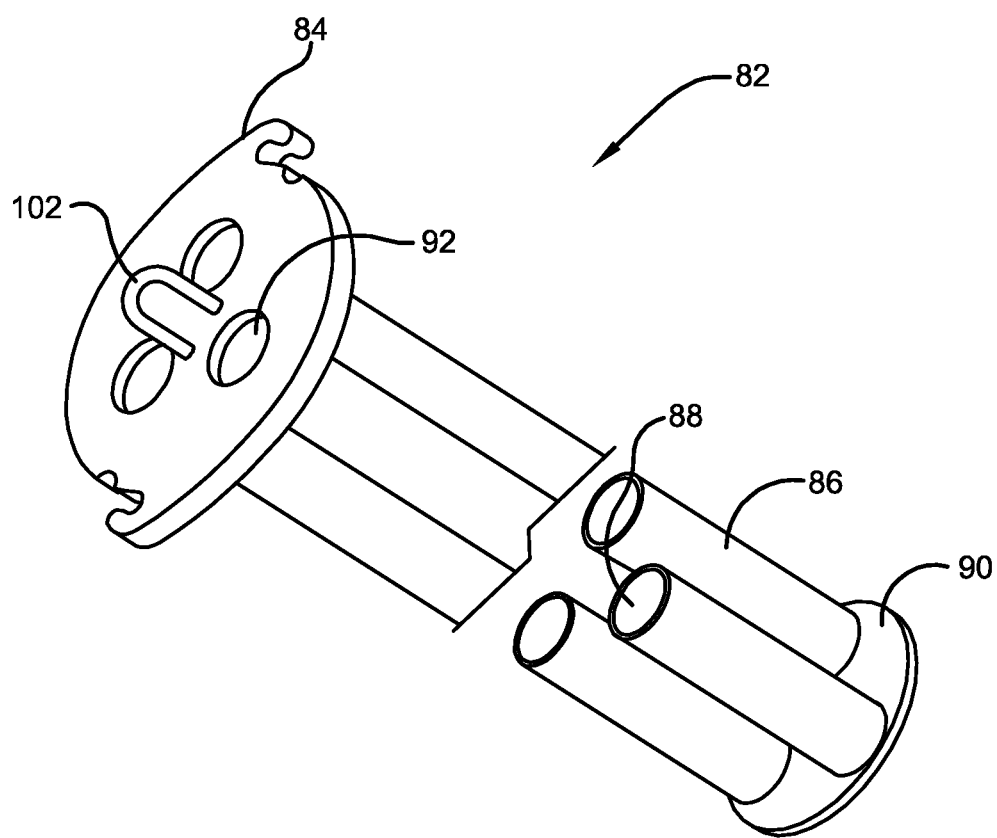
FIG. 5 is an isometric view of an example filter element assembly.
Figure 6:
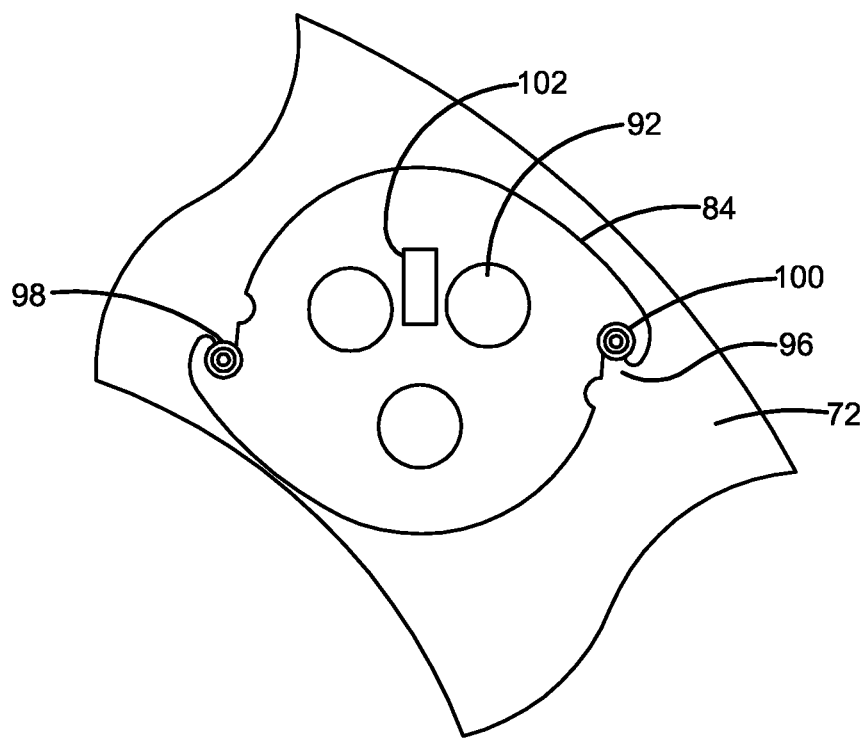
FIG. 6 is a top plan view of an example filter element support member in engaged relation with the filter cartridge.
Figure 7:
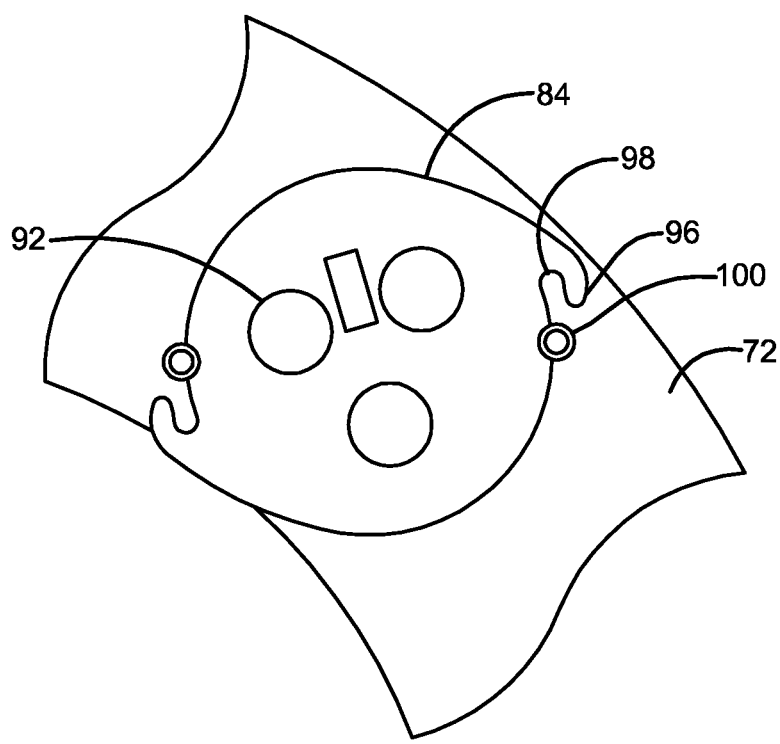
FIG. 7 is a view of a filter element support member similar to FIG. 6 with the member rotated to facilitate disengagement from the filter cartridge.

As shown in FIGS. 5, 6 and 7 each exemplary filter element assembly includes a generally circular filter element support member 84. The exemplary filter element support member 84 includes a generally rigid disc shaped member which has three generally cylindrical elongated filter elements 86 attached thereto. Of course in other example arrangements different numbers of filter elements or filtering structures may be used. In the exemplary arrangement each filter element is comprised of filter material through which liquid is enabled to pass but which prevents the undesirable contaminants from flowing therethrough. As can be appreciated the filter material utilized in a given arrangement will depend on the particular liquid and contaminants involved. The filter material in the exemplary filter element arrangement is arranged in a cylindrical configuration and bounds a central element cavity 88 of each element. As can be appreciated in the exemplary filter arrangement which provides for outside-in flow through the filter elements, the central element cavity houses the filtered liquid from which contaminants have been removed. Each filter element assembly 82 of the exemplary arrangement includes a lower filter plate 90 which is attached to the filter elements at an end opposed of the support member 84. The filter plate 90 is configured to provide support to the elements and to also block unfiltered fluid entry into the central element cavity of each of the filter elements.

In the exemplary embodiment the filter element support member includes three element outlets 92. Each element outlet is in direct fluid connection with a central element cavity of a respective filter element. As a result, each element outlet provides filtered liquid therefrom after the liquid has passed through the filter material. The exemplary arrangement of the body 72 and filter assemblies 82 includes a resilient seal 94 as shown in FIG. 4. The seal 94 is positioned in intermediate relation between the filter element support member 84 and the body 72. The seal minimizes the risk of unfiltered fluid from the first side reaching the second side of the vessel in the area where the filter element support member blockingly engages the respective element opening 74 in which its associated filter elements extend.

As represented in FIGS. 6 and 7, each filter element support member of the exemplary arrangement includes a pair of disposed angled open ears 96. Open ears 96 each bound a respective aperture 98 through which a fastening member may extend. Such a fastening member may include a bolt, stud or other suitable type of fastening member can hold the filter element support member 84 in operatively engaged relation with the second body 72.

As can be appreciated from FIGS. 6 and 7, the exemplary filter element support member is held in engagement with the second body through fasteners 100. Fasteners 100 when tight, hold the support member 84 in a fixed rotational position relative to the cartridge. This is represented in FIG. 6.

Loosening and/or removing the fasteners 100 enables the filter element support member to be rotated so that the open ears are no longer engaged by the fasteners. In this position the filter element support member 84 and the filter elements attached thereto may be extended from and removed from the interior of the respective element housing 76. Each filter element support member 84 of the exemplary arrangement includes a lifting eye 102 which is configured for engagement with a lifting member. The lifting eye facilitates the removal and/or replacement of filter element assemblies 82 included in the filter element cartridge. Further the exemplary arrangement enables the filter element assemblies to be disengaged and replaced without the need for removing the fasteners 100 from engagement with the second body 72. This reduces the risk that the fasteners may be dropped or otherwise lost during filter element replacement operations. Of course it should be understood that this arrangement is exemplary and in other embodiments, other arrangements may be used.

Referring again to FIG. 1, in the exemplary filter arrangement during filter operation when no back flushing is occurring, the dirty liquid passes into the inlet 14 and moves upward into the element housing 76 through the back flush openings 68 in the cartridge. The dirty liquid flows to the filter elements and the filter material thereof through which the liquid flows from the outside of the element to the central element cavity. As the liquid flows across the filter material, contaminants are removed and collected on the outside of the filter material. The liquid that has been cleansed of the contaminants flows upward in the central element cavity 88 of each filter element and passes upward through the element openings in each filter element support member. The clean liquid then flows in the area above the first body 58 of the filter cartridge and on the outside of the element housings 76 to the filter outlet 16. It should be noted that a potential advantage of the exemplary arrangement is that the filter cartridge includes a central open area which is bounded by the element housings 76. This open area may be used for additional liquid treatment devices. These may include, for example, additional filtration devices, heaters, coolers, mixers, injectors, radiation output devices or other suitable components that are desirable for purposes of additionally treating the filtered liquid before it is delivered from the filter outlet. Of course the nature of the additional processing equipment that can be positioned within the filter will depend on the particular process in which the filter is used.

Figure 8:
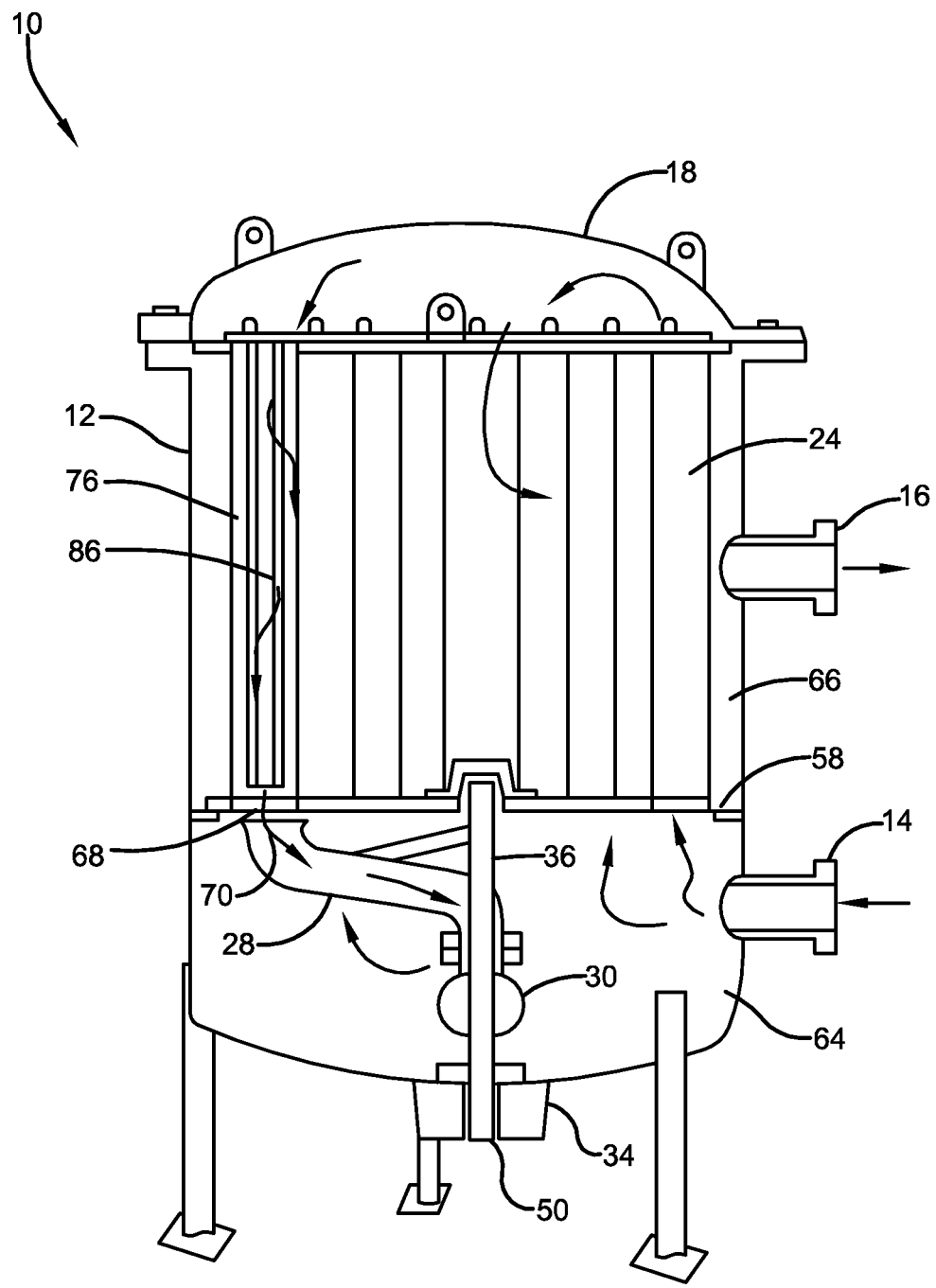
FIG. 8 is a schematic view similar to FIG. 1 showing the filter vessel during a back flush operation for a filter element assembly.

Referring now to FIG. 8, flow during a back flushing operation of the exemplary filter cartridge is represented. In an exemplary arrangement, the drive 34 may be operated to rotate the back flush conduit arm 28 so that the opening 70 thereto moves into aligned relation with each of the back flush openings 68 during at least one rotational cycle of the arm. This may be periodically done with the back flush valve 52 in the open condition so that flow across the filter elements is reversed and the contaminants are discharged from the filter in the manner later described in detail. In some exemplary arrangements the drive 34 may be operated while the back flush valve is in the open condition so that the opening 70 moves into alignment with each back flush opening 68 at least one time while the drive continuously moves the back flush arm relative to the openings. The back flush valve can then be changed to the closed condition to end the back flush operation.

In other alternative exemplary arrangements the drive 34 may be in operative connection with at least one suitable sensor which is operative to provide electrical signals that indicate to control circuitry the current position of the back flush conduit arm 28. This enables the control circuitry associated with the filter to position the back flush conduit arm 28 at a suitable stationary rotational location for purposes of back flushing a particular filter assembly. Such suitable positioning sensors may include, for example, an optical encoder, limit switches, cam switches or other suitable sensors for determining a current angular position of the back flush conduit arm. In some example arrangements, the back flush conduit arm may be positioned in a location that is disposed from alignment with any of the back flush openings 68 in the first body when filtering is occurring without a current back flush operation. In this configuration the opening 70 of the back flush conduit arm 28 is generally disposed away from and does not interfere with fluid flow into the back flush openings 68 or the associated element housings 76.

As the filter is operated over a period of time, contaminants are collected on the outer surfaces of the filter elements. While in most filtering applications a limited build-up of a layer of such contaminants does not significantly impede fluid flow through the filter and may even help in catching contaminants, the build-up eventually becomes sufficiently great that the fluid flow is impeded. In some arrangements the unacceptable build-up of contaminants on the filter elements may be detected via suitable sensors and circuitry associated with the control circuitry for the filter. Such sensors might include in some arrangements, pressure sensors that detect the difference in pressure between the fluid at the inlet and the fluid at the outlet. In other arrangements flow rate may be monitored at the filter outlet and a level of build-up of separated contaminants on the filter elements detected via a drop in flow rate. In other arrangements sensors such as optical sensors, ultrasonic sensors or other types of sensors that can detect a build-up of material on an element surface or in another area which is representative of contaminant build-up. In still other arrangements the control circuitry may cause periodic back flushing of filter elements on a timed basis regardless of the then current level of contaminant build-up on the elements. Of course these approaches are exemplary of approaches that may be used to determine when back flush cycles are to occur.

When a back flush cycle is determined by the control circuitry of the filter to be necessary or desirable, the circuitry operates to cause the opening 70 of the back flush conduit arm 28 to be positioned in generally aligned relation with a respective back flush opening 68. This may be done by operating the drive 34 so that the opening 70 in back flush conduit arm 28 moves rotationally on a continuous basis such that the arm opening moves adjacent to each respective back flush opening 68. Alternatively in other embodiments alignment may be achieved through signals from the sensor associated with the drive 34 which can accurately determine the position of the arm and its associated opening and stop the arm in the desired rotational location. This aligned condition is represented in FIG. 8 in which the opening 70 in the back flush conduit arm 28 is positioned below a back flush opening 68 on the left side of the housing as shown.

In an exemplary arrangement the back flush conduit arm does not contact the first body 58 of the cartridge 24. Instead the opening 70 of the back flush arm remains slightly disposed away from the first body 58. This arrangement is useful in some filters in which the velocity flow into the back flush conduit arm 28 during back flushing is sufficient to carry the contaminants away from the interior of the respective element housing without a significant amount of the contaminants traveling into the lower part of the vessel away from the opening. This arrangement is also useful in some filters as it avoids the need to have a sealing element extending between the back flush arm and the first body 58 of the cartridge 24. Of course this approach is exemplary and in other filter arrangements other approaches may be used.

In order to accomplish back flushing of the filter elements in the housing 76 with which the back flush conduit arm 28 is aligned, the control circuitry associated with the filter operates to cause the back flush valve 52 to change from a closed condition to an open condition. Opening the back flush valve in the exemplary embodiment causes the back flush conduit 30 and the back flush conduit arm 28 to be generally at atmosphere pressure. This is lower than the pressure on the second side 66 of the filter where the clean fluid is located. As a result, the flow through the filter elements 86 in the element housing 76 with which the back flush conduit arm is aligned, is caused to be reversed. As the flow across the filter material is reversed due to the lower pressure of the outside of the element, the accumulated contaminants on the filter material are pushed off the filter elements by the reverse flow of clean liquid backwards therethrough. The contaminants move downward through the associated back flush conduit arm opening 70 and out of the filter vessel through the arm 28 and outlet conduit 30.

In the exemplary arrangement the back flushing condition of the filter elements in the particular filter assembly may be carried out for a predetermined time through operation of the control circuitry. The predetermined time may correspond to a period determined as sufficient to generally clear contaminants from the filter elements. Alternatively or in addition sensors such as flow sensors, optical sensors, ultrasonic sensors or other sensors usable for detecting outlet flow or remaining contaminant build-up may be used to sense when the filter elements have generally been back flushed to the extent that the build-up of contaminants has been generally removed.

In an exemplary arrangement where the back flush conduit arm 28 is moved continuously past the back flush openings 68 while the back flush valve 52 is in the open condition, the time each filter element is back flushed may be controlled by the speed at which the back flush arm is moved. As can be appreciated, the slower the back flush conduit arm 28 is moved through operation of the drive 34, the longer the arm opening 70 will remain in back flushing fluid communication with the filter elements in each particular filter assembly. Alternatively or in addition, the control circuitry may operate to cause the back flush conduit arm to be moved through more than one rotation while the back flush valve remains in the open condition. In such operation the filter elements in each filter assembly may be back flushed multiple times during a back flush operation. Of course these approaches are exemplary.

In the exemplary arrangement once the period of back flushing is completed, the control circuitry is operative to cause the back flush valve to close. This causes the reverse flow through the elements to cease because the back flush arm and back flush opening are no longer at a lower pressure than the pressure on the second side 66 of the filter vessel. The flow then resumes through the filter elements from the outside to the inside to continue the filtration process.

In alternative arrangements the control circuitry may operate to cause each filter assembly to be back flushed separately. In such an arrangement the back flush conduit arm 28 is positioned with its opening 70 in stationary aligned relation with a back flush opening 68. The back flush valve 52 is then changed from the closed condition to the open condition responsive to the control circuitry. This causes the respective filter assembly with which the back flush arm is aligned to be back flushed. The back flush operation continues for a period of time or based on parameters sensed through operation of the control circuitry. The control circuitry then causes the back flush valve to change to the closed condition. Thereafter in this exemplary arrangement the control circuitry associated with the filter will then cause the process of back flushing to be repeated for another element assembly. This is done by control circuitry operating to cause the drive 34 to move the back flush conduit arm 28 so that its opening 70 is in stationary alignment with another one of the back flush openings 68. Thereafter the back flush valve is opened and another filter assembly housed within an element housing is back flushed in the manner previously discussed.

It should be noted that in the exemplary filter arrangement, while one filter assembly is being back flushed, the remaining filter assemblies continue to operate to filter the liquid in the normal manner. Thus while in some arrangements there is a drop in pressure and flow during the back flush activity, generally the delivery of cleansed liquid through the outlet 16 of the filter can be maintained. Thus in most arrangements there is no need to shut down the filter or the associated process that uses the liquid during back flushing. Of course this approach is exemplary and in other embodiments flow through the outlet 16 can be stopped while back flushing is conducted. This may have the advantage in some arrangements that all of the fluid pressure that is available at the inlet of the filter is utilized for purposes of the back flush operation.

In some exemplary arrangements various approaches may be taken with the back flushing filter elements. The approaches may depend, for example, on the particular liquid and contaminants involved. For example in some arrangements the control circuitry may operate to cycle the back flush valve between the open and closed positions a number of times to vary the back flush flow and/or create a fluid hammer or other effect to facilitate breaking contaminants loose from the surface of the filter material. Alternatively in other arrangements flow rates may be varied in a manner that is designed to achieve a caked build-up of contaminants to break loose in pieces sized to facilitate their flow into the fluid arm. Various approaches for controlling the back flush operation and for using the control circuitry associated with the filter to achieve back flushing results that are desirable for the particular filtering environment may be accomplished.

The exemplary filter also enables the carrying out of methods that facilitate the servicing of the filter. For example changing filter elements in the cartridge assembly 24 can be accomplished with the cartridge remaining installed within the vessel. This is accomplished by removing the fasteners 20 holding the head 18 to the vessel. Thereafter removing the head 18 exposes the cartridge opening 56.

With the cartridge opening exposed, the two fasteners 100 associated with a particular filter element assembly can be loosened so that the filter element support member 84 held in place by such fasteners, can be rotated. Rotation of the filter element support member relative to the second body 72 enables the filter element assembly 82 to be lifted out of the respective element housing 76. This can be accomplished by lifting the filter element assembly through engagement with the associated element lifting eye 102. Thereafter installation of a new filter element assembly can be accomplished by extending the filter elements within the respective element housing and rotating the filter element support member so that the open ears 96 thereof enable the fasteners to extend in the apertures 98. Thereafter the fasteners 100 can be tightened so as to secure the filter element assembly in operative position in engaged relation with the filter cartridge 24.

It should be understood that all of the exemplary plurality of filter element assembles associated with the cartridge 24 may be changed in this manner. Such filter element assembly replacement may be accomplished either with the cartridge 24 positioned within the vessel or alternatively with the cartridge 24 positioned outside of the vessel. This provides flexibility for fast servicing and replacement of the filter elements.

In the exemplary filter arrangement, the cartridge 24 may be changed by removing the head 18 from engagement with the filter vessel 12 in the manner previously mentioned. The cartridge may then be removed through the cartridge opening 56. This can be done in the case of cartridge 24 by lifting the cartridge by the cartridge lifting eyes 80. The cartridge can then be lifted upwards in a manner like that shown in FIG. 3. Once the cartridge is lifted outward to the point where it clears the vessel, it may be placed in an appropriate location for cleaning, servicing and the like. In the exemplary arrangement when the cartridge is lifted, the shaft first end 42 of shaft 36 is disengaged from the shaft accepting opening in the shaft support 46. This is accomplished in the exemplary arrangement because the shaft first end is arranged to be readily movable both rotationally and in the axial direction in the shaft accepting opening 44.

The filter cartridge 24 is installed in the filter vessel by extending the cartridge 24 above the cartridge opening 56. The cartridge is then lowered vertically into the vessel 12 until the peripheral portion 60 of the first body 58 engages the cartridge support projection 62. In this position the shaft first end 42 extends into the shaft accepting opening in the shaft support 46. Once the cartridge 24 is in operative position, the head 18 is reinstalled on the vessel and the fasteners 20 aligned and tightened. The head in the installed position is configured to operatively engage and hold the cartridge 28 so that annular peripheral portion 60 is in generally fluid tight engagement relative to the cartridge support projection 62. This enables the filter to be placed back into service.

It should be noted that in the exemplary arrangement the removal of the cartridge 24 provides service access to the components of the back flush assembly 26 through the cartridge opening. Thus for example in situations where there are malfunctions of the back flush conduit arm 28, the back flush shaft 36, coupling 38 or back flush outlet conduit 30, service activities can be more readily accomplished because of the enhanced service access.

Additionally in an exemplary arrangement the back flush arm shaft 36 is configured so that the shaft and the back flush conduit arm 28 can be removed as an assembly by displacing the shaft 36 upward in the axial direction. This enables the shaft second end 50 which extends outside the vessel to be displaced from cooperating engagement with the drive. In the exemplary arrangement the shaft and the back flush conduit arm 28 along with the upper half of the fluid coupling 38 can be removed entirely from the vessel. This facilitates cleaning, servicing or other types of repairs. Removal of the back flush conduit arm 28 may also facilitate the cleaning of sludge or the repair of other items in the lower portion of the filter vessel. Further in the exemplary method of repairing the filter, once the back flush fluid conduit arm 28 and shaft assembly 36 have been repaired, they may be reinserted in the openings with the shaft second end 50 extending outside the vessel and into operative engagement with the drive. This enables the filter to be placed back in service by reinstalling the cartridge 24 and the head 18. Of course these methods are exemplary and in other embodiments other approaches may be used.

The example arrangements of the filter element and replaceable filter cartridge have been described herein with reference to particular components, features and methods. Other arrangements may include other components, features and methods which provide similar capabilities and functionality.

In the foregoing description certain terms have been used to describe as example arrangements for purposes of brevity, clarity and understanding, however no unnecessary limitations are to be implied therefrom because such terms have been used for descriptive purposes and are intended to be broadly construed. Moreover, the descriptions and illustrations herein are by way of examples and the inventive teachings are not limited to the specific features shown and described.

Further, in the following claims any feature described as a means for performing a function shall be construed as encompassing any means known to those skilled in the art as being capable of carrying out the recited function, and shall not be deemed limited to the particular means shown or described for performing the recited function in the foregoing description, or mere equivalents thereof.

Having described the features, discoveries and principles of the exemplary arrangements, the manner in which they are constructed and operated, and the advantages and useful results attained; the new and useful structures, devices, elements, arrangements, parts, combinations, systems, equipment, operations, methods, processes and relationships are set forth in the appended claims.

I claim:

1. Apparatus comprising:
a filter cartridge configured to be removably installed in a liquid holding filter vessel, wherein the cartridge includes:
 a first body,
  wherein the first body includes an annular peripheral surface that extends generally in a plane,
 a second body,
  wherein the second body is disposed in an axial direction from the first body,
  wherein the second body is configured to be in operatively supported connection with a plurality of filter elements,
 at least one element housing,
  wherein each element housing extends between and in engaged relation with each of the first body and the second body,
 at least one filter element support member,
  wherein each filter element support member is operatively engaged with at least one filter element,
  wherein each filter element support member is releasibly engageable with the second body,
   wherein in an engaged condition of a respective filter element support member and the second body, the at least one filter element operatively engaged with the respective filter element support member extends in a respective element housing.

2. The apparatus according to claim 1
wherein the at least one filter element support member comprises a plurality of filter element support members,
wherein each respective filter element support member includes at least one aperture,
 wherein the respective filter element support member is releasibly held in fixed engagement with the second body through fastener engagement through the at least one aperture.

3. Apparatus comprising:
a filter element assembly configured for installation in a filter cartridge,
 wherein the filter cartridge is configured to be removably installed in a liquid holding filter vessel,
 wherein the cartridge includes:
  a first body,
   wherein the first body includes a first annular peripheral surface extending generally in a plane,
  a shaft accepting support,
   wherein the shaft accepting support is in operatively supporting connection with the first body,
   wherein the shaft accepting support includes a shaft accepting opening,
    wherein the shaft accepting opening is configured to releasibly receive a back flush arm shaft therein, and
    wherein the shaft accepting opening extends in an axial direction generally normal of the plane,
  a second body,
   wherein the second body is axially disposed from the first body,
  wherein the first body includes a plurality of back flush openings,
   wherein the plurality of back flush openings are arranged in a first ring on the first body,
  wherein the second body includes a plurality of element openings,
   wherein each element opening is generally axially aligned with a respective back flush opening, a plurality of element housing tubes,
wherein each element housing tube extends in generally fluid tight engagement with a respective one element opening and a respective one back flush opening,
wherein the second body is configured to releasibly engage a plurality of filter element assemblies,
wherein the filter element assembly comprises:
a plurality of filter elements,
wherein each filter element includes an elongated filter body comprised of filter material,
wherein the filter material bounds a central element cavity of each respective filter element,
a filter element support member,
wherein the plurality of filter elements are operatively attached to the filter element support member,
wherein the filter element support member includes a plurality of element outlet openings,
wherein each element outlet opening is in direct fluid connection with a central element cavity of one of the filter elements,
wherein the filter element support member is configured to engage and fluidly block a respective one of the element openings when the plurality of filter elements operatively attached to the filter element support member extend in the respective element housing tube associated with a respective element opening.

4. Apparatus comprising:
a filter cartridge configured to be removably installed in a liquid holding filter vessel, wherein the cartridge includes:
a first body,
wherein the first body includes an annular peripheral surface that extends generally in a plane,
a second body,
wherein the second body is disposed in an axial direction from the first body,
wherein the second body is configured to be in operatively supported connection with a plurality of filter elements,
at least one element housing,
wherein each element housing extends between the first body and the second body,
at least one filter element support member,
wherein each filter element support member is operatively engaged with at least one filter element,
wherein each filter element support member is releasibly engageable with the second body,
wherein in an engaged condition of a respective filter element support member and the second body, the at least one filter element operatively engaged with the respective filter element support member extends in a respective element housing, and
wherein the first body includes a plurality of back flush openings, wherein each back flush opening is axially aligned with at least one filter element.

5. The apparatus according to claim 2
wherein the at least one element housing comprises a plurality of element housings,
wherein each element housing is in fluid communication with a respective back flush opening,
wherein at least one filter element extends in each element housing,
wherein the second body includes a plurality of element openings,
wherein each element opening is in fluid communication with a respective element housing.

6. Apparatus comprising:
a filter cartridge configured to be removably installed in a liquid holding filter vessel, wherein the cartridge includes:
a first body,
wherein the first body includes an annular peripheral surface that extends generally in a plane,
a shaft accepting support,
wherein the shaft accepting support is in operatively supported connection with the first body,
wherein the shaft accepting support includes a shaft accepting opening,
wherein the shaft accepting opening is configured to releasibly receive and enable rotation therein of a back flush arm shaft,
wherein the shaft accepting opening extends in an axial direction generally normal of the plane,
a second body,
wherein the second body is disposed in the axial direction from the first body,
wherein the second body is configured to be in operatively supported connection with a plurality of filter elements,
at least one element housing,
wherein each element housing extends between the first body and the second body,
at least one filter element support member,
wherein each filter element support member is operatively engaged with at least one filter element,
wherein each filter element support member is releasibly engageable with the second body,
wherein in an engaged condition of a respective filter element support member and the second body, the at least one filter element operatively engaged with the respective filter element support member extends in a respective element housing.

7. Apparatus comprising:
a filter cartridge configured to be removably installed in a liquid holding filter vessel, wherein the cartridge includes:
a first body,
wherein the first body includes an annular peripheral surface that extends generally in a plane,
a second body,
wherein the second body is disposed in an axial direction from the first body,
wherein the second body is configured to be in operatively supported connection with a plurality of filter elements,
at least one element housing,
wherein each element housing extends between the first body and the second body,
a plurality of filter element support members,
wherein each filter element support member is operatively engaged with at least one filter element,
wherein each respective filter element support member includes at least one angled open ear which bounds an aperture,
wherein the respective filter element support member is releasibly holdable in fixed engagement with the second body through fastener engagement through the at least one aperture, and wherein when the respective filter element support member is in fixed engagement with the second body, the at least one filter element operatively engaged with the respective filter element support member extends in a respective element housing.

8. Apparatus comprising:
a filter cartridge configured to be removably installed in a liquid holding filter vessel, wherein the cartridge includes:
a first body,
wherein the first body includes an annular peripheral surface that extends generally in a plane,
a second body,
wherein the second body is disposed in an axial direction from the first body,
wherein the second body includes a plurality of element openings,
a plurality of element housings,
wherein each element housing extends between the first body and the second body,
wherein each respective element opening is in fluid communication with a respective element housing,
a plurality of filter element support members,
wherein each filter element support member is operatively engaged with at least one filter element,
wherein each filter element support member is releasibly operatively engageable with the second body,
wherein in an engaged condition of a respective filter element support member and the second body, the at least one filter element operatively engaged with the respective filter element support member extends in a respective element housing and the respective filter element support member is in generally fluid blocking relation with the respective element opening, and
wherein the at least one filter element is removable through the respective element opening when the respective filter element support member is not operatively engaged with the second body.

9. The apparatus according to claim 8
wherein each filter element includes filter material,
wherein the filter material bounds a central element cavity,
wherein the respective filter element support member in operative engagement with the filter element includes an element outlet opening,
wherein the element outlet opening is in direct fluid connection with the central element cavity of the filter element.

10. The apparatus according to claim 9
wherein each filter element support member is in operative connection with a plurality of filter elements,
wherein each filter element support member includes a plurality of the element outlet openings,
wherein each element outlet opening is in direct fluid connection with a central element cavity of a respective filter element.

11. The apparatus according to claim 9
wherein the at least one element housing comprises a plurality of element housings,
wherein the cartridge includes a plurality of support members,
wherein each support member is in operatively supporting connection with the first body and the second body, and
wherein each support member is outside each of the element housings.

12. The apparatus according to claim 11
wherein the first body is generally disc shaped,
wherein the second body is generally disc shaped,
wherein the first body includes a plurality of back flush openings,
wherein each back flush opening is axially aligned with at least one filter element,
wherein the plurality of back flush openings are arranged in a first ring on the first body,
wherein the plurality of element openings are arranged in a second ring on the second body,
wherein each of the respective element housings include an elongated tube positioned intermediate of the first body and the second body and in generally fluid tight engagement with a respective first element opening and a respective back flush opening.

13. The apparatus according to claim 12
wherein the second body is in operative connection with at least one cartridge lifting eye,
wherein the at least one cartridge lifting eye is configured to engage a lifting member.

14. The apparatus according to claim 12
a shaft accepting support,
wherein the shaft accepting support is in operatively supported connection with the first body,
wherein the shaft accepting support includes a shaft accepting opening,
wherein the shaft accepting opening is configured to releasibly receive and enable rotation therein of a back flush arm shaft,
wherein the shaft accepting opening extends in an axial direction generally normal of the plane.

15. The apparatus according to claim 14 and further comprising:
a back flush conduit arm,
wherein the back flush conduit arm is configured to be positioned within the liquid holding filter vessel,
wherein the back flush conduit arm includes an arm fluid opening,
wherein the arm fluid opening is configured to generally correspond to the back flush openings,
a back flush arm shaft,
wherein the back flush arm shaft is in operative connection with the back flush conduit arm,
wherein the back flush arm shaft includes a shaft first end,
wherein the shaft first end is configured to be releasibly accepted in the shaft accepting opening of the cartridge,
wherein with the shaft first end in engaged relation with the shaft accepting opening, the arm fluid opening is respectively movable into generally aligned relation with each of the plurality of back flush openings of the first ring.

16. The apparatus according to claim 15 and further including
a rotatable fluid coupling,
wherein the rotatable fluid coupling is in operative connection with the back flush conduit arm,
wherein the rotatable fluid coupling is operative to fluidly connect the back flush conduit arm and a back flush outlet conduit,
wherein the back flush outlet conduit is operative to conduct fluid to outside the liquid holding filter vessel.

17. The apparatus according to claim 15 and further comprising:
   a back flush conduit arm support strut,
      wherein the support strut is in operatively supporting connection with the back flush arm shaft and the back flush conduit arm.

18. The apparatus according to claim 15 wherein the back flush arm shaft includes a shaft second end generally opposed of the shaft first end,
      wherein the back flush arm shaft is configured such that in an operative position of the back flush conduit arm, the shaft second end extends outside the liquid holding filter vessel.

19. The apparatus according to claim 15 and further comprising the liquid holding filter vessel,
      wherein the vessel includes an internal annular inward extending cartridge support projection,
         wherein in an operative position of the cartridge, the cartridge is supported through operative supporting engagement of the annular peripheral surface and the annular cartridge support projection.

20. The apparatus according to claim 19 wherein the vessel includes a fluid inlet and a fluid outlet, and a vessel interior area,
      wherein the fluid inlet is in direct fluid connection with the vessel interior area on a first side of the annular inward extending cartridge support projection, and
      wherein the fluid outlet is in direct fluid connection with the vessel interior area on a second side of the annular inward extending cartridge support projection,
         wherein in the operative position of the cartridge, the first body of the cartridge fluidly separates the first side and the second side.

21. The apparatus according to claim 20 wherein the vessel includes a removable head,
      wherein the head is releasibly engageable with the vessel,
      wherein in a head removed condition, a cartridge opening is accessible,
         wherein the cartridge is removable from and installable in the vessel interior area through the cartridge opening.

22. The apparatus according to claim 21 and further comprising:
   a drive,
      wherein the drive is in operative connection with the vessel outside the vessel interior area,
      wherein the drive is in operative connection with the back flush arm shaft, and
      wherein the drive is operable to selectively rotate the back flush conduit arm.

23. The apparatus according to claim 22 and further including
   a back flush outlet conduit,
      wherein the back flush outlet conduit extends in the vessel interior area,
   a rotatable fluid coupling in operative connection with the back flush conduit arm,
      wherein the rotatable fluid coupling is operative to fluidly connect the back flush conduit arm and the back flush outlet conduit,
   wherein the vessel includes a back flush outlet,
      wherein the back flush outlet is in fluid connection with the back flush outlet conduit,
      wherein the back flush outlet is in fluid connection with a back flush valve positioned exteriorly of the vessel, and
         wherein the back flush valve is selectively changeable between an open condition and a closed condition,
   wherein at least one filter element within a respective element housing is back flushed responsive to the arm fluid opening being positioned through operation of the drive in generally aligned relation with the respective back flush opening, and the back flush valve being changed from the closed condition to the open condition.

24. The apparatus according to claim 8 wherein each filter element support member is in operative connection with a respective lifting eye,
      wherein the lifting eye is configured to be engageable with a lifting member.

\* \* \* \* \*